United States Patent [19]

Norcia et al.

[11] Patent Number: 4,683,843

[45] Date of Patent: Aug. 4, 1987

[54] NITROUS OXIDE FUEL INJECTION SAFETY SYSTEM

[75] Inventors: John A. Norcia; William M. Wheatley; Michael D. Norcia, all of Columbia, S.C.

[73] Assignee: Ram Automotive Company, Columbia, S.C.

[21] Appl. No.: 896,055

[22] Filed: Aug. 13, 1986

[51] Int. Cl.$^4$ .............................................. F02B 75/12
[52] U.S. Cl. .................................... 123/1 A; 123/575; 123/445
[58] Field of Search ................ 123/1 A, 575, 445, 525

[56] References Cited

U.S. PATENT DOCUMENTS 4,494,488 1/1985 Wheatley .......................... 123/1 A
4,572,140 2/1986 Wheatley .......................... 123/541

OTHER PUBLICATIONS

Superpower "Nitrous Oxide Injection" 1977, Pat Ganahl, p. 64.
Article entitled Nitrous Charging by Ice by Internal Combustion Engineering located in Tucson, Arizona.

*Primary Examiner*—E. Rollins Cross
*Attorney, Agent, or Firm*—Sand & Hudak

[57] ABSTRACT

A fuel charging system which injects nitrous oxide into the engine of a high performance vehicle to provide an instant burst of power to the vehicle. A nitrous oxide supply line feeds nitrous oxide under pressure from a supply container thereof into the vehicle engine through a spray bar. A normally closed solenoid valve controls the flow of nitrous oxide into the vehicle engine through the supply line. The supply line also is connected to a vent tube having a normally open solenoid valve controlling the flow of nitrous oxide thereto. The vent valve communicates with a one-way low pressure actuated check valve and vents any nitrous oxide leaking past the closed solenoid control valve into the atmosphere to prevent the harmful buildup of nitrous oxide in the engine. A pair of pressure actuated electrical switches are connected to and actuated by the pressure of the oil and fuel sources of the vehicle to prevent the actuation of the nitrous oxide control valve if a sufficient supply of fuel is not available to mix with the nitrous oxide and if the engine RPM is not sufficient for receiving the additional burst of power. The check valve reduces momentary back pressure in the nitrous oxide flow line which heretofore occurred at the time when increased power is needed most in a race. Also the vented leaking nitrous oxide is visable to the vehicle operator enabling appropriate action to be taken to prevent damage to the vehicle.

17 Claims, 2 Drawing Figures

U.S. Patent
Aug. 4, 1987
4,683,843
FIG. 1
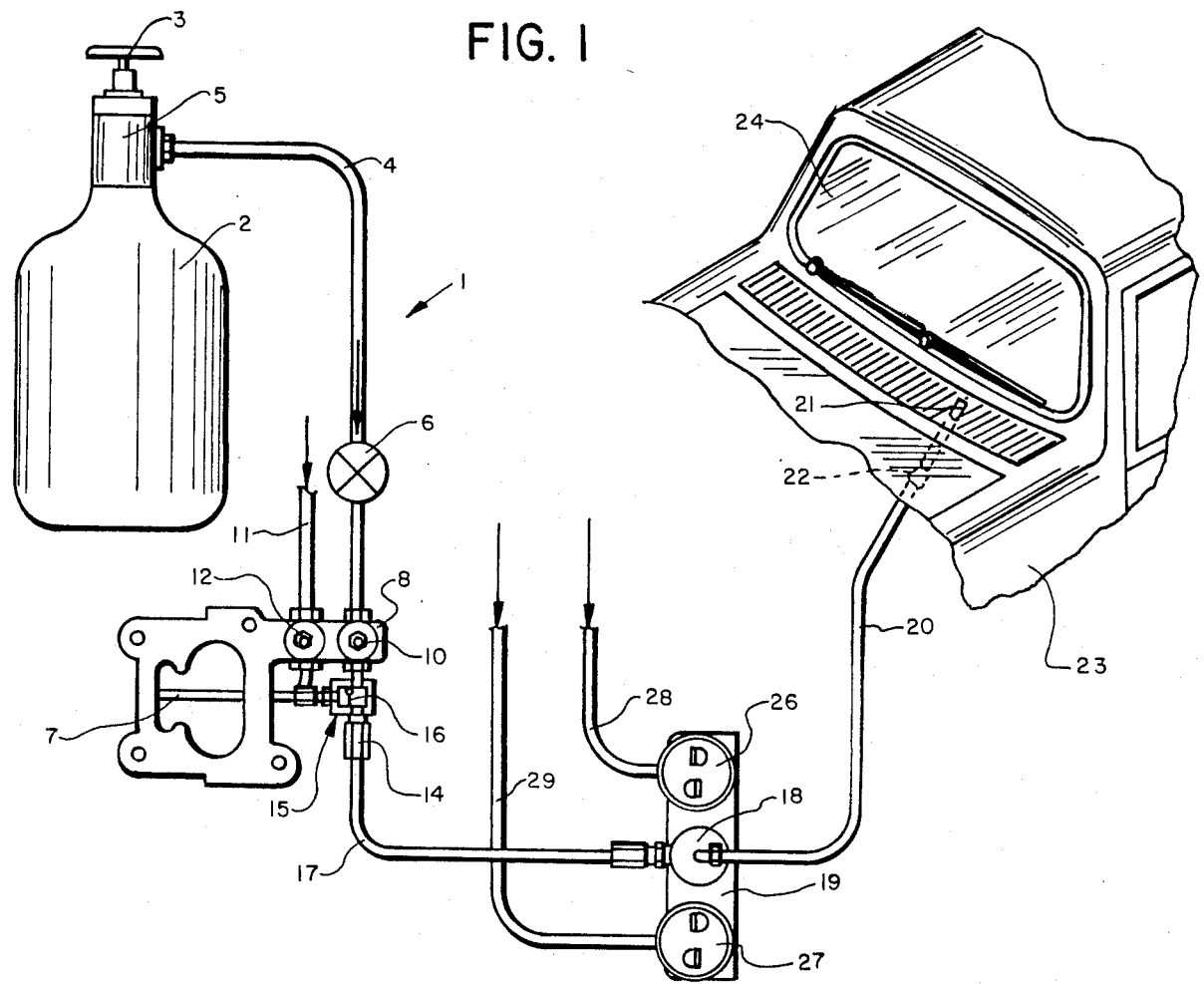
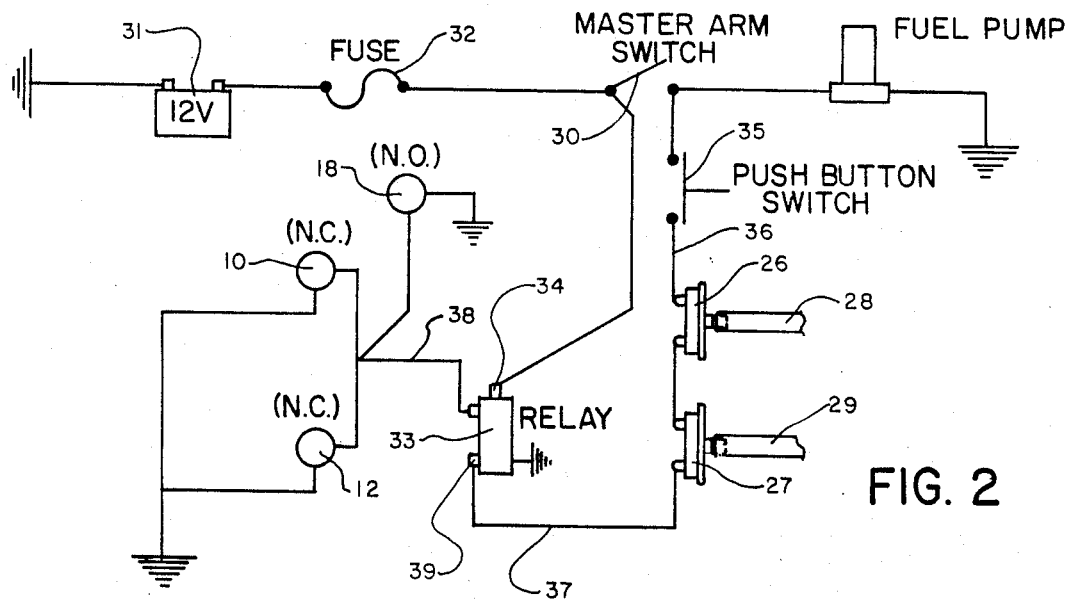
FIG. 2

NITROUS OXIDE FUEL INJECTION SAFETY SYSTEM

TECHNICAL FIELD

The invention relates to a fuel charging system which supplies liquid nitrous oxide to the engine of a high performance vehicle, such as a racing vehicle, to provide it with a sudden burst of power. More particularly, the invention relates to such a charging system containing various control valves to enhance the safety of the system.

BACKGROUND ART

The chemical supercharging of racing engines has been used for some time in the racing and high performance vehicle industry for supplying a sudden burst of power to the vehicle engine for increased engine horsepower and torque. Nitrous oxide is a nonflammable liquid/gas used for such chemical supercharging which when introduced into the combustion chamber of an engine breaks down into its elements of nitrogen and oxygen. The free oxygen is then available to oxidize additional fuel that is supplied to the engine and mixed with the oxygen resulting in a large increase in power. This will provide a sudden burst of power to the vehicle for use in the final stretch of a race or for passing another vehicle at critical times in the race. Existing injection systems usually consist of a spacer plate placed under the carburetor or at the air intake on fuel injected engines. This plate carries spray bars or nozzles for introducing into the engine the nitrous oxide and the additional fuel required to maintain the proper fuel/oxygen ratio for maximum power. The nitrous oxide and fuel flow is turned on and off by solenoid valves usually located near the spacer plate or spray nozzles which also may be mounted directly in the intake manifold just ahead of the intake part in the cylinder head. These valves are controlled by a manually operated push-button switch accessible to the driver. Examples of such nitrous oxide fuel charging systems and components related thereto are shown in U.S. Pat. Nos. 4,494,488 and 4,572,140.

These prior and existing nitrous oxide fuel injection systems, although providing enhanced power when needed for a racing vehicle, possess certain problems. When the solenoid valve controlling the flow of nitrous oxide is switched to the open position by the driver, nitrous oxide under high pressure (approximately 900 psi) surges into the feed line and spray bar or nozzles where it meets resistance from restricted openings before passing as a spray into the engine intake. At this point a momentary back pressure is created in the feed line and the flow of nitrous oxide stops or is greatly diminished. This creates two problems related to power output or engine performance.

The engine sees an initial supply of nitrous oxide followed by a momentary deficiency thereof then followed by a proper and continuous flow. During this deficiency period, that can last as long as 0.30 seconds, there is no performance increase. Thus a serious reduction of power for up to 0.30 seconds results in situations where races are won by hundredths of a second. Also, at the time the nitrous oxide solenoid control valve is opened, a fuel solenoid feed valve is opened, and the additional fuel required to be mixed with the nitrous oxide flows into the spray bar or nozzles. The fuel is under a pressure of only 6 or 7 psi and no system reversion or back pressure is experienced. This means that during the momentary period of nitrous oxide deficiency, the engine is getting the additional fuel but not the nitrous oxide. This results in a rich mixture condition and resulting power loss which degrades performance to a level substantially below the engine's power potential without the nitrous oxide system. Therefore, there is a need in nitrous oxide fuel charging systems to elimiate or drastically reduce the momentary back pressure in the nitrous oxide feed line.

Another problem that exists in nitrous oxide fuel injection systems is that under certain circumstances the use of nitrous oxide or the failure of a nitrous oxide system component can cause problems for the driver and the vehicle engine. Satisfactory operation of the nitrous oxide injection system requires a proper proportion of fuel to the nitrous oxide being introduced into the engine. Should the fuel system, fuel pump, or the fuel supply fail, the engine will run lean and damage can occur to the engine pistons. Also, if the vehicle driver actuates the nitrous oxide system when the engine RPM is low, damage to the engine can occur through detonation or preignition.

For example, a given flow of nitrous oxide fuel will enter the engine upon actuation of the nitrous oxide fuel charging system whether the engine is running at 2000 RPM or 4000 RPM. However, at 4000 RPM, the engine uses approximately one-half the amount of additional power potential per cycle, reducing the additional stress on engine components by one-half in contrast to the increased stress placed on the engine upon injection of the nitrous oxide when the engine is running at an extremely lower RPM.

Another potential hazard associated with nitrous oxide fuel injection systems is failure of the main nitrous oxide control valve. Race vehicles many times are operated in contaminated environments. Failure of the solenoid valve if stuck in full open position, or most commonly in a partial open position caused by the contaminates or failure of the valve to seal properly, will permit nitrous oxide to leak past the valve and enter the intake manifold when the engine is not running and accumulate therein. Subsequent starting of the engine can cause an explosion in the manifold and possible damage to the carburetor or engine possibly resulting in explosion or fire in the engine compartment. These conditions have occurred in the past where the race driver is unaware of the failure of the nitrous oxide control valve and the accumulation of nitrous oxide in the engine when not running.

Therefore the need has existed for a nitrous oxide fuel injection system and in particular to such a system having safety features incorporated therein which eliminates or materially reduces the problems discussed above.

DISCLOSURE OF THE INVENTION

Objectives of the invention include providing a nitrous oxide fuel injection safety system for high performance vehicles which enables a supply of nitrous oxide to be supplied in relative safety to the vehicle engine to provide a sudden burst of power to increase the efficiency and torque of the vehicle engine to provide the driver with a competitive edge. A further objective is to provide such an improved fuel charging system which incorporates a low pressure actuated check valve in the nitrous oxide supply line to prevent or materially reduce the back pressure in the nitrous oxide supply until the flow supply has stabilized reducing the length of the deficiency period and to prevent a rich fuel/nitrous oxide mixture condition to occur in the engine.

A further objective is to provide such an improved nitrous oxide fuel injection safety system in which a fuel pressure switch protects the engine in that if the fuel pressure is too low to insure fuel delivery for achieving the proper mixture with the incoming nitrous oxide, the nitrous oxide control solenoid will not engage and the entire system will be turned off preventing any damage to the vehicle or engine. A further objective is to provide such an improved system having an oil pressure actuated switch which will prevent actuation of the nitrous oxide supply solenoid valve if the engine speed is below a predetermined level to receive the nitrous oxide. A still further objective is to provide such an improved safety system in which a normally open vent valve is operatively connected with the nitrous oxide solenoid supply valve in combination with a low pressure one-way check valve, whereby any nitrous oxide leaking through the valve is vented to the surrounding atmosphere to prevent it from entering and accumulating in the intake manifold, and in which a visual indication is provided to the vehicle driver if a sufficiently large amount of nitrous oxide is escaping through the control solenoid valve when the valve is suppose to be in the closed position.

Another objective of the invention is to provide such a safety system that when the activation push button switch is released by the vehicle driver during normal operation of the system, a vent valve opens and residual pressure in the nitrous oxide supply line escapes and can be visually noted by the driver by a puff of white vapor. Furthermore, the visual portion of the safety system produces a constant vapor visible to the driver if the nitrous oxide supply solenoid valve is stuck in full open position to enable the driver to take steps to turn off the nitrous oxide supply and clear the engine of vapors before attempting to restart in addition to providing an indication if an appreciable amount of nitrous oxide is leaking past the control valve.

These objectives and advantages are achieved by the improved nitrous oxide fuel injection safety system of the invention, which system is intended for use with engines of high performance vehicles of the type having a supply of pressurized liquid nitrous oxide, means for spraying predetermined quantities of fuel and nitrous oxide into the vehicle engine, and control valve means for controlling the flow of nitrous oxide into the spray means, wherein the general nature of said invention includes first valve means communicating with the control valve means; and means placing said first valve means in an open position when the control valve means is in a closed position for venting any nitrous oxide to the atmosphere which leaks past the control valve means when said control valve means is in the closed position, and for placing said first valve means in a closed position when the control valve means is in an open position to block the flow of nitrous oxide to the atmosphere.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 1 is a fragmentary diagrammatic view of the main components of the improved fuel charging system shown connected to the spray bar of a base plate which will be located between a carburetor and an intake manifold of an engine; and FIG. 2 is a schematic electrical diagram of the improved safety system.

Similar numerals refer to similar parts throughout the drawings.

BEST MODE FOR CARRYING OUT THE INVENTION

The improved nitrous oxide fuel charging safety system is indicated generally at 1, and is shown diagrammatically in FIG. 1. System 1 includes a nitrous oxide supply cylinder or container 2, which contains a supply of nitrous oxide under pressure (approximately 900 psi) which may be of the type described in U.S. Pat. No. 4,494,488. A usual manually operated control valve 3 is mounted on supply cylinder 2 and a supply conduit or line 4 is connected to the outlet thereof located on cylinder neck 5. Supply line 4 is connected to a manually actuated control valve 6 and to a spray bar 7 mounted on a base plate 8. Plate 8 is adapted to be mounted in a usual manner between the carburetor and intake manifold (not shown) of a vehicle engine.

A solenoid control valve 10 is mounted in nitrous oxide supply line 4 and controls the flow of nitrous oxide through line 4 and into spray bar 7. A fuel supply line 11 extends from a usual fuel supply and is connected to spray bar 7 or to a separate bar (not shown) which aligns with bar 7 for mixing fuel with incoming nitrous oxide flowing through line 4. Another solenoid control valve 12 is mounted in fuel line 11 and controls the flow of fuel therethrough into spray bar 7.

In accordance with the invention, a low pressure one-way check valve indicated generally at 15, is mounted in nitrous oxide supply line 4 at the junction with spray bar 7. Check valve 15 includes a one-way valve plate 16 shown diagrammatically in FIG. 1 which is located to impede the flow of nitrous oxide entering into spray bar 7 from line 4 without impeding the flow of nitrous oxide from valve 4 into a vent line 17 which is connected to valve 15 by a coupler 14. Vent line 17 is connected to a normally open solenoid vent valve 18 mounted on a bracket 19 which is mounted at an appropriate location on the racing vehicle. Another vent line 20 extends from valve 18 and is connected to a vent tube 21 which is mounted by a bracket 22 on the front portion of vehicle 23 adjacent windshield 24.

In accordance with another feature of the invention, a fuel pressure switch 26 and an oil pressure switch 27 are mounted on bracket 19 and are connected to a fuel supply line 28 and an oil supply line 29, respectively which communicates with a source of fuel pressure and oil pressure of the vehicle in a manner well known in the art.

The operation of improved injection safety system 1 and the advantages achieved thereby are further revealed by reference to the electrical schematic diagram of FIG. 2. Nitrous oxide solenoid control valve 10 is a normally closed valve and blocks the flow of nitrous oxide from bottle 2 into spray bar 7. Nitrous oxide solenoid vent valve 18 is a normally open valve whereby any nitrous oxide trapped in line 17 or leaking past solenoid valve 10 will flow through valve 18 and line 20 and be admitted into the atmosphere through vent tube 21. In the event that a sufficiently large amount of nitrous oxide is escaping through valve 10, a white vapor will be visible to the driver as the nitrous oxide vents through tube 21. If a sufficiently large amount of vapor is noted a relatively large leak is indicated. The driver then can actuates manual control valve 6, which will be located within the driver compartment, completely shutting off the supply of nitrous oxide to the system components to eliminate any possible problems before the malfunction can be corrected. If the leak is minor, the escaping nitrous oxide may not be visible to the driver but the nitrous oxide is prevented from entering into the intake manifold through spray bar 7 by low pressure valve plate 16 of one-way check valve 15. Valve 15 may have a cracking pressure of 50 to 75 psi which is sufficient to keep leaking nitrous oxide out of the spray bar and manifold without interfering with the main flow of nitrous oxide to spray bar 7 upon opening of supply valve 10. Leaking nitrous oxide will have insufficient pressure to actuate valve 15 and will continue through normally open vent valve 18 and out of valve tube 21.

The driver at the start of a race will arm the fuel injection system by actuating a master arming switch 30. This will provide D.C. power from vehicle battery 31 preferably through a protective fuse 32 to one side of a manually controlled system actuation push button 35 and to terminal 34 of a relay 33. During the course of the race, the driver, when desiring the sudden burst of power will manually actuate push buttom 35 located in the driver's compartment. This will supply D.C. power to terminal 39 of relay 33 through conductors 36 and 37 if fuel and oil pressure switches 26 and 27 are closed. Switch 26 will be closed if sufficient pressure is supplied thereto through fuel pressure line 28, which insures that sufficient fuel is available for mixing with the nitrous oxide. Also, if a sufficient engine RPM is present, for example 2000 RPM, the engine oil pressure will be at a predetermined amount, for example 30 psi, which will be sufficient to actuate switch 27 through oil pressure line 29. Only if both switches 26 and 27 are actuated will the electrical path be completed through conductors 36 and 37 to relay 33. Actuation of relay 33 will energize solenoid valves 10, 12 and 18 through conductor 38.

Therefore, assuming pressure switches 26 and 27 are closed, actuation of push button switch 35 will energize the solenoid valves 10, 12, and 18 which will open the normally closed nitrous oxide and fuel supply solenoid valves 10 and 12, respectively, enabling the desired amount of nitrous oxide and fuel to flow into spray bar 7 while closing the normally open vent valve 18. In addition to assuring that sufficient engine operating conditions are present through fuel and oil pressure switches 26 and 27 when push button 35 is actuated, valve plate 16 of one-way check valve 15 prevents the back flow or reversion from occurring in the system as discussed above upon energizing the system to reduce the heretofore problem of momentary back pressure and the momentary result of loss of power heretofore present in other nitrous oxide fuel injection systems. Should the fuel pressure or the engine speed be too low to insure satisfaction and safe result when push button 35 is actuated, either or both pressure switches 26 and 27 will not close preventing solenoid control valves 10, 12 and 18 from being energized through relay 33.

During normal operation of the system when push button switch 35 is released, breaking the electrical circuit through conductors 36, 37, and 38 to the solenoid valves 10, 12, and 18, vent valve 18 opens and the residual pressure in lines 17 and 20 will escape through vent tube 21. This will be noted by the driver as a puff of white vapor and provides a visual indication to the driver that the system is operating properly. Furthermore, in the event that the nitrous oxide supply valve 10 sticks in full open position, a constant visible vapor will be discharged from tube 21 and the driver would know immediately that his manifold is being supplied with nitrous oxide enabling him to take steps to shut off the flow of nitrous oxide by actuation of manual control valve 6 and clear the engine of nitrous oxide before attempting to restart or reactuate the injection system.

Accordingly the improved nitrous oxide injection system provides for the heretofore increased burst of power while providing sufficient safeguards to prevent damage to the vehicle and/or engine and the driver thereof by insuring that the correct engine operating conditions are present and that the critical nitrous oxide control solenoid valve is functioning properly.

Accordingly, the improved safety system is simplified, provides an effective, safe, inexpensive, and efficient system which achieves all the enumerated objectives, provides for eliminating difficulties encountered with prior systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to broadly construed.

Having now described the features, discoveries and principles of the invention, the manner in which the improved nitrous oxide fuel injection safety system is constructed and used, the characteristics of the system, and the advantageous, new and useful results obtained; the new and useful structures, devices, elements, arrangements, parts and combinations, are set forth in the appended claims.

What is claimed is:

1. An improved nitrous oxide fuel charging system for the engine of a high performance vehicle of the type having a supply of pressurized liquid nitrous oxide, means for spraying predetermined quantities of fuel and nitrous oxide into the vehicle engine, and control valve means for controlling the flow of nitrous oxide into the spray means, wherein said improvement includes first valve means communicating with the control valve means; and means placing said first valve means in an open position when the control valve means is in a closed position for venting any nitrous oxide to the atmosphere which leaks past the control valve means when said control valve means is in the closed position, and for placing said first valve means in a closed position when the control valve means is in an open position to block the flow of nitrous oxide to the atmosphere.

2. The fuel charging system defined in claim 1 in which second valve means is located downstream from the control valve means in the direction of nitrous oxide flow for blocking the flow of nitrous oxide into the spray means when said nitrous oxide is below a predetermined pressure which is less than the pressure of the supply of liquid nitrous oxide without blocking the flow of escaping nitrous oxide from the control valve means to the first valve means.

3. The fuel charging system defined in claim 1 in which a vent tube communicates with the first valve means and is located adjacent a front windshield of the high performance vehicle to provide a visual indication that nitrous oxide is leaking past the control valve means.

4. The fuel charging system defined in claim 1 in which a driver controlled manually operated shutoff valve is adapted to be located within the interior of the vehicle for stopping the flow of nitrous oxide from the pressurized supply of said nitrous oxide to the control valve means.

5. The fuel charging system defined in claim 1 in which first pressure actuated switch means communicates with a fuel source for the vehicle and is operatively connected to the control valve means preventing actuation of said control valve means if the fuel pressure is below a predetermined level.

6. The fuel charging system defined in claim 1 in which second pressure actuated switch means communicates with a lubricating oil source for the vehicle and is operatively connected to the control valve means preventing actuation of said control valve means if the oil pressure is below a predetermined level.

7. The fuel charging system defined in claim 1 in which the control valve means and first valve means are solenoid operated valves.

8. The fuel charging system defined in claim 2 in which the first valve means is a normally open solenoid valve; in which the second valve means is a check valve; and in which an outlet of the first valve means is connected to an inlet of the second valve means by a conduit for directing the flow of escaping nitrous oxide therebetween.

9. The fuel charging system defined in claim 8 in which the control valve means is a normally closed solenoid valve; and in which first and second normally open pressure valves communicate with a source of fuel and a source of oil for the vehicle engine, respectively, and communicates with the control valve means preventing the closing of said control valve means if the pressure of the engine fuel or oil is below a predetermined level.

10. The fuel charging system defined in claim 1 in which the control valve means is a normally closed solenoid valve and the first valve means is a normally open solenoid valve; in which a driver actuated switch connects said solenoid valves to a source of D.C. power; and in which actuation of said switch will close the first valve means to block the flow of nitrous oxide to the atmosphere and open the control valve means to supply the spray means with pressurized nitrous oxide.

11. A nitrous oxide fuel charging system for the engine of a high performance vehicle including:
(a) a supply of pressurized liquid nitrous oxide;
(b) means connected to the nitrous oxide supply for injecting a quantity of the nitrous oxide into the vehicle engine;
(c) first valve means having open and closed positions for controlling the flow of nitrous oxide from the supply thereof to the injection means;
(d) vent means communicating with the first valve means for discharging any nitrous oxide to the atmosphere which leaks past said first valve means when in the closed position; and
(e) second valve means connected between the first valve means and the injection means and communicating with the vent means for reducing backflow of nitrous oxide from the injection means into the vent means and for blocking the flow of low pressure nitrous oxide into the injection means.

12. The nitrous oxide fuel charging system defined in claim 11 in which the vent means includes a solenoid valve; in which the first valve means is a solenoid valve; and in which the second valve means is a check valve.

13. The nitrous oxide fuel charging system defined in claim 11 in which pressure actuated switch means is operatively connected to the first valve means and is actuated in response to at least one vehicle engine operating condition for preventing actuation of said first valve means if said one engine operating condition is not present.

14. The nitrous oxide fuel charging system defined in claim 13 in which the pressure actuated switch means includes a first pressure switch actuated in response to a predetermined engine speed and a second pressure switch actuated in response to the pressure of the fuel flow to the vehicle engine.

15. The nitrous oxide fuel charging system defined in claim 14 in which the vent means and first valve means each includes a solenoid valve; in which the first and second pressure switches are electrically connected to said solenoid valves; and in which an actuation switch is connected in series with the pressure switches and electrically connect said solenoid valves to a source of D.C. power.

16. The nitrous oxide fuel charging system defined in claim 15 in which a relay electrically connects the pressure switches to the solenoid valves.

17. The nitrous oxide fuel charging system defined in claim 11 in which third valve means controls the flow of fuel into the injection system.

\* \* \* \* \*